US008097229B2

(12) United States Patent
Zhou et al.

(10) Patent No.: US 8,097,229 B2
(45) Date of Patent: Jan. 17, 2012

(54) METHODS FOR MANUFACTURING FUNCTIONALIZED INORGANIC OXIDES AND POLYMERS INCORPORATING SAME

(75) Inventors: Bing Zhou, Cranbury, NJ (US); Changkun Liu, Lawrenceville, NJ (US); Clementine Reyes, Lawrenceville, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 1485 days.

(21) Appl. No.: 11/333,559

(22) Filed: Jan. 17, 2006

(65) Prior Publication Data

US 2007/0167562 A1 Jul. 19, 2007

(51) Int. Cl.
*C01B 33/12* (2006.01)
(52) U.S. Cl. ........ 423/335; 502/150; 502/155; 502/159; 524/81; 524/157; 524/167; 524/210; 524/284; 524/356; 524/379
(58) Field of Classification Search .................. 423/335; 502/150, 155, 159; 524/81, 157, 167, 210, 524/284, 356, 379
See application file for complete search history.

(56) References Cited

U.S. PATENT DOCUMENTS

| | | | |
|---|---|---|---|
| 3,900,557 A | 8/1975 | Strathdee | 423/580.2 |
| 3,993,635 A | 11/1976 | Mango, III | 524/547 |
| 4,071,494 A | 1/1978 | Gaylord | |
| 4,220,556 A | 9/1980 | Oswald et al. | 502/158 |
| 4,276,195 A | 6/1981 | Verkade | |
| 4,409,365 A | 10/1983 | Coran | |
| 4,652,311 A | 3/1987 | Gulla et al. | |
| 5,093,297 A | 3/1992 | Woo et al. | 502/155 |
| 5,164,491 A | 11/1992 | Froehler et al. | 536/26.3 |
| 5,225,282 A | 7/1993 | Chagnon | |
| 5,300,604 A | 4/1994 | Näsman et al. | 526/278 |
| 5,352,791 A | 10/1994 | Panster et al. | 546/165 |
| 5,438,111 A | 8/1995 | Panster et al. | 528/9 |
| 5,587,439 A | 12/1996 | DiMaio | 526/142 |
| 5,624,711 A | 4/1997 | Sundberg | |
| 5,767,229 A | 6/1998 | Arretz et al. | 528/374 |
| 5,770,539 A | 6/1998 | Chen et al. | 502/152 |
| 5,789,333 A | 8/1998 | Angelici et al. | 502/113 |
| 5,990,318 A | 11/1999 | Chan et al. | 548/412 |
| 6,005,148 A | 12/1999 | Tanielyan et al. | 568/454 |
| 6,017,742 A | 1/2000 | Takenishi et al. | 435/180 |
| 6,025,295 A | 2/2000 | Tanielyan et al. | 502/154 |
| 6,136,746 A | 10/2000 | Tanielyan et al. | 502/154 |
| 6,177,558 B1 | 1/2001 | Brennan et al. | 536/25.3 |
| 6,197,994 B1 | 3/2001 | Song et al. | 560/60 |
| 6,201,086 B1 | 3/2001 | Garnier | 526/258 |
| 6,218,331 B1 | 4/2001 | DiMaio et al. | 502/109 |
| 6,228,783 B1 | 5/2001 | Foster, Jr. et al. | 442/121 |
| 6,232,264 B1 | 5/2001 | Lukehart et al. | 502/339 |
| 6,254,803 B1 | 7/2001 | Matthews et al. | 252/188.28 |
| 6,300,456 B1 | 10/2001 | Musa | |
| 6,300,486 B1 | 10/2001 | Froehler et al. | 536/23.1 |
| 6,331,500 B1 | 12/2001 | Tsuji et al. | 502/63 |
| 6,331,601 B1 | 12/2001 | Hlatky | 526/171 |
| 6,369,257 B1 | 4/2002 | Bunel et al. | 556/136 |
| 6,372,002 B1 | 4/2002 | D'Evelyn et al. | 51/307 |
| 6,455,594 B1 | 9/2002 | Tsuji | |
| 6,462,095 B1 | 10/2002 | Bönsel et al. | |
| 6,475,945 B1 | 11/2002 | Carnahan et al. | 502/87 |
| 6,489,258 B1 | 12/2002 | Ying et al. | 502/60 |
| 6,492,460 B2 | 12/2002 | Haq et al. | 525/50 |
| 6,544,923 B1 | 4/2003 | Ying et al. | 502/159 |
| 6,600,016 B1 | 7/2003 | Campian et al. | 530/334 |
| 6,660,338 B1 | 12/2003 | Hargreaves | 427/399 |
| 6,686,308 B2 | 2/2004 | Mao et al. | |
| 6,689,820 B2 | 2/2004 | Muranaka | |
| 6,709,824 B2 | 3/2004 | Jacobsen et al. | |
| 6,787,612 B1 | 9/2004 | Siev et al. | 525/375 |
| 6,787,635 B2 | 9/2004 | Rasmussen et al. | 530/334 |
| 6,796,649 B2 | 9/2004 | Chu et al. | 347/105 |
| 6,815,390 B2 | 11/2004 | Vaughan et al. | 502/150 |
| 6,818,259 B1 | 11/2004 | Koontz | 427/562 |
| 2001/0051221 A1 | 12/2001 | Lefkowitz et al. | 427/387 |
| 2002/0032262 A1 | 3/2002 | Zhang et al. | 524/375 |
| 2002/0094466 A1 | 7/2002 | Kerres et al. | 429/33 |
| 2002/0169262 A1 | 11/2002 | Carnahan et al. | 526/160 |
| 2002/0173051 A1 | 11/2002 | Rasmussen et al. | 436/518 |
| 2003/0032739 A1 | 2/2003 | Kerres et al. | 525/535 |
| 2003/0059537 A1 | 3/2003 | Chilkoti et al. | 427/256 |

(Continued)

FOREIGN PATENT DOCUMENTS

DE 10316323 10/2004

(Continued)

OTHER PUBLICATIONS

Citation: Journal of Adhesion Science and Technology (2003) v. 17(12), p. 1713-1726; Accession No./Database: 2004:640 APOLLIT.

*Primary Examiner* — Peter D Mulcahy

(74) *Attorney, Agent, or Firm* — Workman Nydegger

(57) ABSTRACT

Inorganic oxide substrates are functionalized with silicon-free organic functionalizing agents. The organic functionalizing agent has a bonding functional group for bonding to the substrate and a functionalizing moiety that is not bonded to the substrate for imparting a desired functionality to the substrate. The functionalized inorganic oxide substrates are manufactured by selecting a functionalizing agent and reaction conditions that allows the bonding functional group to bond to the inorganic material while leaving the functionalizing moiety available for providing the desired functionality. The functionalized inorganic oxides can be used as filler materials in polymers or to manufacture a supported nanoparticle catalyst.

29 Claims, No Drawings

U.S. PATENT DOCUMENTS

| | | |
|---|---|---|
| 2003/0092565 A1 | 5/2003 | Chaudhari et al. |
| 2003/0099781 A1 | 5/2003 | Lefebvre et al. ............... 427/551 |
| 2003/0148878 A1 | 8/2003 | Vaughan et al. ............... 502/159 |
| 2003/0190472 A1 | 10/2003 | Moussa ........................... 428/403 |
| 2003/0212222 A1 | 11/2003 | Carnahan et al. .............. 526/161 |
| 2003/0229191 A1 | 12/2003 | Kallury et al. ................. 526/310 |
| 2004/0018295 A1 | 1/2004 | Qiu et al. ......................... 427/2.1 |
| 2004/0018312 A1 | 1/2004 | Halladay ........................ 427/387 |
| 2004/0115368 A1 | 6/2004 | Chu et al. ....................... 428/32.1 |
| 2004/0115433 A1 | 6/2004 | Elaissari et al. .............. 428/407 |
| 2004/0147618 A1 | 7/2004 | Lee et al. |
| 2004/0234788 A1 | 11/2004 | Li et al. .......................... 428/447 |
| 2004/0265899 A1 | 12/2004 | Rasmussen et al. ............. 435/6 |
| 2005/0003188 A1 | 1/2005 | Bass et al. ...................... 428/402 |
| 2005/0009092 A1 | 1/2005 | Brennan ............................ 435/6 |
| 2005/0014635 A1* | 1/2005 | Zhou et al. .................... 502/159 |
| 2005/0048287 A1 | 3/2005 | Ebner et al. ................. 428/411.1 |
| 2005/0048667 A1 | 3/2005 | Ellman et al. ................. 436/174 |
| 2005/0283003 A1 | 12/2005 | Spudich |
| 2006/0000758 A1 | 1/2006 | Wormsbecher |
| 2006/0079396 A1 | 4/2006 | Saito |
| 2009/0012209 A1* | 1/2009 | Eckhardt et al. .............. 523/116 |

FOREIGN PATENT DOCUMENTS

| | | |
|---|---|---|
| JP | 05-255425 | 10/1993 |
| JP | 11-255738 | 9/1999 |
| JP | 11-256035 | 9/1999 |
| JP | 2004-002850 | 1/2004 |
| JP | 2004-131713 | 4/2004 |
| NL | 9201378 | 2/1994 |
| WO | 2004/007364 | 1/2004 |
| WO | WO 2004/007364 | 1/2004 |

* cited by examiner

METHODS FOR MANUFACTURING FUNCTIONALIZED INORGANIC OXIDES AND POLYMERS INCORPORATING SAME

BACKGROUND OF THE INVENTION

1. The Field of the Invention

The present invention relates to methods for functionalizing inorganic oxides such as silica. Specifically, inorganic oxides are functionalized with organic agents that are free of silicon. The functionalized inorganic oxides can be used for a variety of purposes such as supports for catalysts.

2. The Relevant Technology

Solid inorganic oxides such as silica, alumina, and other inorganic oxides are used in many different materials for a wide variety of applications. For example, silica and alumina can be used as filler materials or as supports for catalysts.

The surface properties of the inorganic oxide can be very important to the overall performance of the material. For example, the surface properties of the particle often determine how well the inorganic oxide will bond with other materials.

It is common to modify the surface of inorganic oxides to give the inorganic oxide particular properties. Inorganic oxides such as silica have been functionalized with many different types of functional groups, including carboxy, hydroxyl, thiol, amino, and other useful functional groups.

The existing methods for functionalizing solid inorganic materials with desired functional groups requires reacting the inorganic oxide (e.g., silica) with an organosilane. Organosilanes have the general formula of $XSiY_3$ where X is a terminally functionalized organic compound and Y is an alkoxide or halide. Typically the organosilane reacts with functional groups on the surface of the inorganic material to lose Y in a condensation or substitution reaction.

Although silanes are very good functionalizing agents for functionalizing inorganic materials, silanes have limitations. One disadvantage of using silanes is the limited options for selecting the reaction conditions for carrying out the functionalization. This disadvantage can limit the types of functionalizing groups or can significantly increase the manufacturing costs, or both.

Therefore what is needed is a method of functionalizing inorganic materials with desired functional groups while avoiding the limitations and expenses of silanes.

BRIEF SUMMARY OF THE INVENTION

The present invention relates to methods for manufacturing functionalized inorganic oxide substrates using organic functionalizing agents that are free of silicon. The inorganic oxides can be used as a filler material by incorporating the functionalized inorganic oxides into a polymer. The silicon free organic functionalizing agents of the present invention include (i) at least one bonding functional group that is capable of bonding with the surface of the inorganic material and (ii) at least one functionalizing moiety that imparts a desired functionality to the inorganic oxide substrate once the functionalizing agent is bonded thereto.

The bonding functional group on the functionalizing agent is selected to react with surface functional groups on the inorganic oxide (e.g., hydroxyl groups). In an exemplary embodiment, the bonding functional groups of the anchoring agent comprise a hydroxyl, a carboxyl, a carbonyl, an amine, an amide, a nitrile, a nitrogen with a free lone pair of electrons, an amino acid, a thiol, a sulfonic acid, a sulfonyl halide, and/or an acyl halide.

The functionalizing moiety is a second reactive group on the anchoring agent. The functionalizing moiety and reaction conditions are selected such that the functionalizing moiety does not react with substrate. Once the functionalizing agent is bonded to the substrate the functionalizing moiety imparts a desired functionality to the inorganic oxide substrate. Almost any functionality can be given to the inorganic material using the methods of the present invention. The functionalizing groups can provide functionality such as a positive charge, a negative charge, aromaticity, hydrophobicity, hydrophilicity, combinations of these, and the like. Suitable functionalizing moieties include those listed above as suitable bonding agents.

The non-silane, organic functionalizing agent can be a small organic molecule, oligomer, or polymer. Examples of suitable functionalizing agents include one or more of oxalic acid, malic acid, malonic acid, maleic acid, succinic acid, glycolic acid, lactic acid, glucose, citric acid, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, sulfonated polyethylene terephthalate, or combinations of these.

Using the methods of the present invention, an inorganic oxide can be functionalized to have functionalities not readily available by functionalizing with a silane. The bonding functional groups of silanes are typically limited to alkoxides and halides. The bonding functional groups of the functionalizing agents of the present invention are not limited in this regard. The reaction conditions for functionalizing the inorganic oxides of the present invention can be significantly different than reaction conditions for silanes since the functionalizing agents of the present invention are not limited in the same way silane compounds are.

The present invention also includes polymeric materials incorporating the functionalized inorganic oxides of the present invention. The polymeric material can be any polymer including, but not limited to, polypropylene, nitrile rubber, polystyrene, polyamides, and the like.

The functionalizing moiety is selected to bond with the particular type of functional groups present in the polymer. Using the method of the present invention, any bonding arrangement can be achieved between the polymer and the inorganic oxide by selecting a functionalizing moiety with an appropriate chemical property such as a positive charge, a negative charge, aromaticity, hydrophobicity, and/or hydrophilicity. For example, for polymers that are hydrophobic, the inorganic oxides can be functionalized with hydrophobic functionalizing moieties. For polymers with anionic functional groups, the inorganic oxide can be functionalized with a cationic functionalizing moiety (or vice versa).

The polymers combined with the functionalized inorganic oxides of the present invention have improved properties do to the bonding between the filler and polymer as compared to other polymers that are filled with filler materials. Polymeric materials made using the present invention are particularly advantageous for use in polymers where high strength is important, such polymers used to make automobile parts (e.g. bumpers, tires, dashboards, and hoses for brake lines and heating and cooling systems).

In an alternative embodiment the functionalized inorganic oxide is used as a precursor material for forming supported catalytic nanoparticles. A detailed description of methods for making supported catalytic nanoparticles using functionalized inorganic oxides is disclosed in U.S. patent application Ser. No. 11/126,963, entitled "Methods for Manufacturing Supported Nanocatalysts and Methods For Using Supported Nanocatalysts," filed May 10, 2005, which is hereby incorporated by reference in its entirety. One advantage of using a support material manufactured according to the present invention is that the functionalizing molecules on the catalyst support preferably do not contain metals and/or heteroatoms. Thus, the functionalizing agents of the present invention cannot contribute to undesirable leaching of metals and/or heteroatoms.

These and other advantages and features of the present invention will become more fully apparent from the following description and appended claims as set forth hereinafter.

DETAILED DESCRIPTION OF EXEMPLARY EMBODIMENTS

I. Introduction

The functionalized inorganic oxide substrates of the present invention are manufactured using silicon-free organic functionalizing agents. The organic functionalizing agent has a bonding functional group for bonding to the support and a functionalizing moiety for imparting a desired functionality to the substrate. The functionalized inorganic oxide substrates are manufactured by selecting a functionalizing agent and reaction conditions that allows the bonding functional group to bond to the support while leaving the functionalizing moiety available for providing the desired functionality.

II. Components Used to Manufacture Functionalized Inorganic Oxide

A. Inorganic Oxide Substrates

Any solid inorganic oxide substrate can be used to form functionalized substrates according to the present invention so long as the inorganic oxide has surface functional groups or can be made to have surface functional groups that are available for bonding with the functionalizing agent. Suitable inorganic oxides include, but are not limited to, alumina, silica, silica gel, titania, kieselguhr, diatomaceous earth, bentonite, clay, zirconia, magnesia, as well as the oxides of various other metals, alone or in combination. They also include porous solids collectively known as zeolites, natural or synthetic, or other inorganic oxide materials that have ordered or quasi-ordered pore structures.

Exemplary inorganic oxide substrates may be in a variety of physical forms. They may be either porous or non-porous. They may be 3-dimensional structures such as a powder, granule, tablet, extrudates, or other 3-dimensional structure. Substrates may also be in the form of 2-dimensional structures such as films, coatings, or other mainly 2-dimensional structures. They may be 1-dimensional structures, such as fibers or other essentially linear structures.

The physical form of the inorganic oxide substrate will depend on the particular application in which the substrate is being used. Those skilled in the art are familiar with the particular physical form that is needed for a particular application. For example, substrates used as catalyst supports are often a porous particulate. Catalyst support materials advantageously have a particle size of about 1 micron to about 5 mm and a surface area of about 100 to about 1000 $m^2/g$, although support materials having other particle sizes and surface areas can also be used.

B. Functionalizing Agents and Molecules

The functionalizing agents and molecules are organic compounds that include functional groups that give the functionalizing agent molecules desired reactive properties. An advantageous feature of the functionalizing agent molecules is that they are free from silicon atoms. Silicon-free functionalizing agents can provide unique functionality to the substrate and/or can reduce the cost of adding such functionality to an inorganic oxide substrate.

The functionalizing agents include individual molecules having at least two functional groups: a bonding functional group allows the functionalizing agent to be bonded to the substrate and a functionalizing moiety gives the substrate a desired functionality. The two or more functional groups (i.e., the bonding functional group and the functionalizing moiety) may be of the same type, or may be selected from two or more different types of functional groups.

The bonding functional group is selected to bond with the surface functional groups on the surface of the substrate. Suitable functional groups for bonding to the inorganic oxide substrate include one or more of a hydroxyl, a carboxyl, carbonyl, an amine, an amide, an amino acid, a thiol, a sulfonic acid, a sulfonyl halide, an acyl halide, a nitrile, a nitrogen with a free lone pair of electrons (e.g., pyridine), combinations of these, or derivatives of these. In many cases, the bond between the bonding functional group and the surface functional groups of the substrate will involve a condensation reaction. Particularly preferred bonding functional groups include carboxyl, hydroxyl, amine, and sulfonic groups alone or in combination. These bonding groups are particularly useful for forming bonds with the hydroxyl groups on the surface of the inorganic oxide.

The functionalizing moiety is selected to give the substrate desired chemical properties. Beneficial properties can be added to the surface of the substrate through groups that have a negative charge, positive charge, or a neutral charge, or that are hydrophilic or hydrophobic. Suitable functionalizing moieties that can provide the desired functionality include the same group of compounds that can be used as bonding functional groups, although the functionalizing moieties are not limited to these. Particularly preferred functionalizing moieties include carboxyl, hydroxyl, amine, nitrile, amide, and halide. These functionalizing moieties are particularly useful for forming catalyst nanoparticles and/or for allowing the functionalizing agent to bond with other materials.

The functionalizing agents used to make functionalized inorganic oxide substrate can be a bifunctional or a polyfunctional molecule. Examples of bifunctional functionalizing agents include diacids such as oxalic acid, malonic acid, maleic acid, succinnol acid, and the like; dialcohols such as ethylene glycol, propylene glycol, 1,3-propanediol, and the like; and hydroxy acids such as glycolic acid, lactic acid, and the like. Useful polyfunctional molecules include sugars such as glucose, polyfunctional carboxylic acids such as citric acid, hydroxy diacids, and the like.

Other useful functionalizing agents include ethanolamine, mercaptoethanol, 2-mercaptoacetate, amino acids such as glycine and alanine, sulfonic acids such as sulfobenzyl alcohol and sulfobenzoic acid, and other sulfobenzyl compounds having amino and thiol functional groups.

Functionalizing agents according to the invention also include polymers or oligomers, which can be natural or synthetic. The molecular weight of the polymer or oligomer molecules may be selected to yield functionalizing agents having a desired number of functional groups per molecule. In general, the number of functional groups is at least 4.

Suitable polymers and oligomers within the scope of the invention include, but are not limited to, polyacrylates, polyvinylbenzoates, polyvinyl sulfate, polyvinyl sulfonates, including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

The particular functionalizing agent selected will depend on the intended use of the functionalized inorganic oxide substrate. For example, where the functionalized substrate is to be used to manufacture supported nanocatalyst particles, the functionalizing agent can be selected to bond to catalyst atoms. Particularly suitable functionalizing agents for forming nanocatalyst particles include citric acid, polyacrylic acid, oxalic acid, ethylene glycol, ethanolamine, glycine, glycolic acid, adipic acid, salts thereof, and combinations thereof.

The exemplary functionalizing agents listed above are referred to in their unbound form. Those skilled in the art will recognize that once the functionalizing agent is reacted with the support and/or the catalyst atoms, the functionalizing agent molecules change slightly, (e.g., by losing a hydrogen or hydroxyl in a condensation reaction). As used herein, the foregoing functionalizing agents and molecules include these derivative compounds.

C. Solvents

A solvent or carrier can be used as a vehicle for combining the inorganic oxides and the functionalizing molecules. The solvent used to make the inventive compositions may be an organic solvent, water or a combination thereof. Organic solvents that can be used include alcohols, ethers, glycols, ketones, aldehydes, nitriles, and the like.

Preferred solvents include methanol, ethanol, n-propanol, isopropyl alcohol, acetonitrile, acetone, tetrahydrofuran, ethylene glycol, dimethylformamide, dimethylsulfoxide, methylene chloride, water, and the like, including mixtures thereof.

Other chemical modifiers may also be included in the liquid mixture. For example, acids or bases may be added to adjust the pH of the mixture and/or to catalyze condensation reactions. Surfactants may be added to adjust the surface tension of the mixture.

II. Methods for Manufacturing Functionalized Inorganic Oxides

Preliminarily, functionalized catalyst supports or other particles are manufactured by reacting one or more bonding functional groups of the functionalizing agent molecules with one or more corresponding surface functional groups of the metal oxide support or other particle. This may be accomplished, for example, by creating conditions that are conducive to the formation of a condensation reaction product between the bonding functional group(s) and the surface functional group of the metal oxide particle. An acid, base, heat or combination thereof may be used to induce the desired condensation reaction. The functionalizing agent molecules are reacted in such a way that unreacted functionalizing moieties remain, thereby yielding functionalized particles. These may be used in any desired manner.

The particular functionalizing moiety selected will often depend on the ultimate use of the functionalized particle. In one embodiment, the functionalized inorganic oxide particles are used as a filler material in a polymer. In another embodiment, the functionalized inorganic oxide is used as a precursor for manufacturing supported nanocatalyst particles.

A. Manufacturing Composite Polymers Incorporating Functionalized Inorganic Oxides The composite polymers of the present invention are manufactured by mixing a polymer with a functionalized inorganic oxide. In this case, the functionalizing moiety is selected to bond with the particular type of polymer that the functionalized particles are to be mixed with.

The polymeric material can be any polymer, such as polypropylene, nitrile rubber, polystyrenes, polystyrene benzenes, polyamides, polybenzimidizoles, polyanilines, polydiallyldimethylammonium chloride, polychloroethylether-dimethylamino-propyl-urea, and the like. After selecting the type of polymer, the functionalizing moiety of the inorganic oxide is selected to bond with the particular type of molecules present in the polymer. Using the method of the present invention, any bonding arrangement can be achieved between the polymer and the inorganic oxide by selecting a functionalizing moiety with an appropriate chemical property such as a positive charge, a negative charge, aromaticity, hydrophobicity, and/or hydrophilicity. Particularly useful functionalizing moieties include amino acids; polyethylene with amino, amine, and/or carboxylic groups. Preferred groups for bonding with polymers include imidazoles, palatines, anilines, and amines.

If the polymer comprises electron rich, hydrophobic and/or aromatic groups (e.g. polystyrene or nitrile rubber) the functionalizing moiety can be selected to be at least partially positively charged or to have electron affinity. Examples include imidazoles, palmatines, anilines, and amines, which have one or more nitrogen groups that can be protentated to form an $—NH_x^+$ (where x is 1-3).

In contrast, if the polymer has positively charged groups (e.g. polyaniline) the functionalizing moiety can be selected to have an electron rich group such as a hydroxyl or a carboxyl group (e.g. citric acid, acrylic acid, glycolic acid, oxalic acid, polyacrylic acid, or their salts). In this manner, polymers that have very low reactivity (e.g. polystyrene and nitrile rubber) can bond with the functionalized filler material (i.e. the functionalized inorganic oxide).

B. Catalyst Supports and Supported Catalysts

In an alternative embodiment of the invention, the functionalized inorganic oxide substrate is manufactured to be a catalyst support that can be used for manufacturing supported catalysts. In this embodiment, the inorganic oxide substrate is configured to be suitable for use as a catalyst support material and the functionalizing agent molecules are selected to bond catalyst atoms.

The catalyst atoms that can be used to form nanocatalyst particles according to the present invention can include any metal or nonmetal, alone or in combination with other elements, so long as the nanoparticles formed therefrom exhibit catalytic activity. Examples include one or more noble metals, which include platinum, palladium, iridium, gold, osmium, ruthenium, rhodium, and rhenium. Examples of other catalyst atoms include one or more base transition metals, rare earth metals, alkaline earth metals, alkali metals, or nonmetals, which can be used alone or in combination with other catalyst materials.

To manufacture the catalyst nanoparticles a solution of catalyst atoms is reacted with the functionalized support. The solution of catalyst atoms is typically formed by dispersing the catalyst atoms in a solvent or carrier to form a solution or suspension. Catalyst atoms can be added to a solution in elemental (e.g., metallic) or ionic form. Typically, the catalyst atoms are added in ionic form so as to more readily dissolve or disperse within the solvent or carrier. Examples of suitable ionic forms include metal halides, nitrates or other appropriate salts that are readily soluble in a solvent or carrier. Specific examples include metal phosphates, sulfates, tungstates, acetates, citrates, and glycolates. Suitable solvents for dispersing the ionic metals include those listed above for use in manufacturing functionalized inorganic oxide substrates.

Once the solution of catalyst atoms is formed, the catalyst atoms are reacted with the functionalized support material to form supported nanoparticles. During the reaction of the functionalized support with the catalyst atoms, the functionalizing moieties available on the functionalized support bond with the catalyst atoms to form catalyst complexes. The term "catalyst complex" refers to a composition in which a bond or coordination complex is formed between the functionalizing moieties and the catalyst atoms. The "bond" between the functional groups and catalyst atoms can be ionic, covalent, electrostatic, or it can involve other bonding forces such as coordination with nonbonding electrons, Van der Waals forces, and the like.

In some cases, the catalyst complex comprises nanocatalyst particles bonded or anchored to the functionalized support (i.e., nanoparticles form as the catalyst atoms react with the functionalizing moieties or shortly thereafter). In other cases, a catalyst complex is initially formed as an intermediate catalyst, without the formation of nanocatalyst particles. The intermediate catalyst composition is then subjected to one or more appropriate processing steps (e.g., heat treatment and/or reduction) to yield the nanocatalyst particles.

During formation of the nanocatalyst particles of the present invention, the functionalizing agent molecules influence the arrangement and/or bonding of the catalyst atoms. Because the functionalizing agent molecules are bonded to the support material, the functionalizing agent molecules influence nanoparticle formation in a particular way. In addition, functionalizing agent molecules may influence catalytic properties because of the way the particles are bonded to the support material during or after particle formation. Regardless of the theoretical cause of the unique and/or improved catalytic properties, the methods of the present invention are advantageous because they provide novel and/or improved catalysts as evidenced by the differences in catalytic properties as compared with known catalysts.

The particular functionalizing agent molecules on the support material can influence the size and crystal face exposure of the nanoparticles. In general, it has been found that small organic molecules or highly branched polymers tend to produce nanoparticles with the 111 crystal face. Linear long chain polymers typically form nanoparticles with the 110 face. A more detailed description of methods for manufacturing nanoparticles with the 111 or 110 crystal face exposed is set forth in U.S. application Ser. Nos. 10/618,909 and 10/618,808 (both of which were filed Jul. 14, 2003), and U.S. Pat. No. 6,746,597, all of which are incorporated herein by reference.

The functionalized supports of the present invention allow for the formation of very small and uniform nanoparticles. In a preferred embodiment, the catalyst nanoparticles formed using the organic functionalizing agents and supports according to the invention are preferably less than about 100 nm, more preferably less than about 10 nm, even more preferably less than about 6 nm, and most preferably less than about 4 nm.

III. EXAMPLES

Example 1

Example 1 describes a method for functionalizing silica with alanine. 5 g silica gel (Silica gel, white type B, 0.5-1.0 mm bead, distributed by PlusPharma), 1 g β-alanine and several drops of trifluoroacetic acid were added to 40 ml THF. The suspension was stirred at 80° C. for 12 hr. The solid was filtered out and washed using water and acetone. After drying at 80° C. for 12 hr under vacuum, the solid was tested by elementary analysis, which showed: C; 1.464%, N; 0.743%. The Carbon and nitrogen amount indicated that the silica was functionalized with alanine. The alanine functionalized silica can be mixed with polystyrene, polystyrene benzene, polybenzimidazole, nitrile rubber and the like.

Example 2

Example 2 describes a method for functionalizing silica with alanine using toluene as a solvent. The steps in Example 1 were repeated except that the reaction was carried out in 40 ml toluene instead of THF. The elementary analysis showed C; 0.961%, N; 0.0496%.

Example 3

Example 3 describes a method for functionalizing silica with citric acid. 5 g of silica gel (silica gel, Merck, grade 7754, high purity, 70-230 mesh) was added to 1.0 g citric acid, several drops of trifluoroacetic acid, and 40 ml THF. The suspension was stirred at 80° C. for 12 hr. The solid was filtered out and washed using water and acetone. After drying at 80° C. for 12 hr under vacuum, the solid was tested by elementary analysis, which showed: C; 0.661%. The citric acid functionalized silica can be mixed with polyanilines, polydiallyldimethylammonium chloride, polychloroethyl-ether-dimethylamino-propyl-urea, and the like.

Example 4

Example 4 describes a method for functionalizing silica with ethylene glycol. 5 g of silica gel (silica gel, Merck, grade 7754, high purity, 70-230 mesh), 1.0 g ethylene glycol, several drops of trifluoroacetic acid, and 40 ml THF were mixed together. The suspension was stirred at 80° C. for 12 hr. The solid was filtered out and washed using water and acetone. After drying at 80° C. for 12 hr under vacuum, the solid was tested by elementary analysis, which showed: C; 0.491%.

In an alternative embodiment, the methods of the present invention can be used to manufacture catalyst supports and supported catalysts. Manufacturing nanocatalysts according to the present invention can produce catalyst with improved catalytic activity for a wide variety of applications. The following examples below give specific data for nanocatalysts manufactured according to the present invention for use in Heck and Suzuki coupling reactions. The catalyst of the present invention show increased catalytic activity as compared with other catalysts.

In Examples 6-8 below, supported palladium based nanocatalysts were used in a Heck reaction to catalyze the carbon-carbon coupling of 2-bromo-6-methoxynapthalene

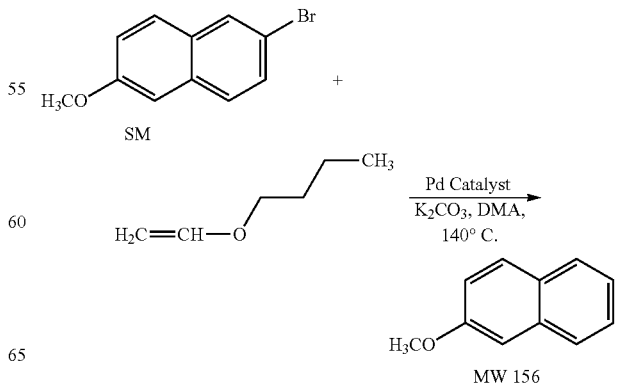

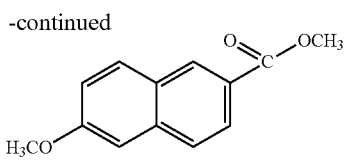

MW200

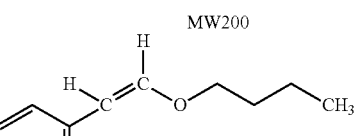

MW256

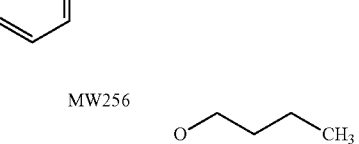

MW256

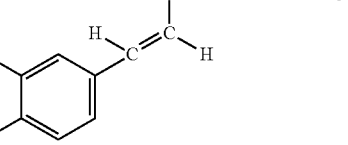

MW256 with n-butyl vinylether. The reaction was carried out according to the following formula:

Example 5

Comparative Homogenous Catalyst

For comparative purposes, the foregoing Heck reaction was carried out using a homogeneous $PdCl_2$ catalyst prepared according to methods that are well-known in the art.

Example 6

Supported Palladium Nanocatalyst Formed Using Other Method

For comparative purposes, both with respect to homogeneous catalysts and supported nanocatalysts made according to the inventive methods, a supported palladium nanocatalyst was prepared for use in the Heck reaction. The comparative supported nanocatalyst was prepared by reacting a plurality of palladium catalyst atoms with polyacrylic acid to form a colloidal solution. More specifically, an acidic solution of $PdCl_2$ (0.6665 g $PdCl_2$ in 500 ml water) and a solution of polyacrylic acid (10.13 g of 45% of polyacrylic acid solution in 100 ml of water) were added to a three neck flask and purged with nitrogen for 2 hours. The mixture was then purged with hydrogen for 45 minutes and stirred overnight.

The suspension was then mixed with an alumina-silica support to form catalyst nanoparticles and to anchor the catalyst nanoparticles to the support. More specifically, a glass reactor containing 10 g of $Al_2O_3$—$SiO_2$ was submitted to 5 cycles of evacuation and refilling with argon over a period of 30 minutes. The support was soaked in methanol (50 ml) for 2 hours followed by decantation of the solvent and addition of the colloid solution previously prepared. The contents were stirred using a suspended stirrer while heat was applied to evaporate the water. Complete evaporation was followed by a calcination step at 30° C. for 6 hours under hydrogen. Washing of the support with water until no free chlorine was detected and drying the support for 3 hours at 100° C. were the final steps of the preparation.

Palladium loading on the support was 4% by weight. The supported palladium nanocatalyst was used to carry out the Heck reaction outlined above.

Example 7

4% Pd on $Al_2O_2$—$SiO_2$ Support

A palladium catalyst was prepared according to the inventive methods of the present application. More particularly, a glass reactor containing 10 g of $Al_2O_3$—$SiO_2$ was submitted to 5 cycles of evacuation and refilled with argon over a period of 30 minutes. The support was soaked in methanol (50 ml) for two hours followed by decantation of the solvent and addition of a solution containing the anchoring agent (10.13 g of 45% polyacrylic acid sodium salt in 250 ml of water). The contents were stirred while heat was applied to evaporate the water. After complete evaporation, the modified support was placed in the oven for 4 hours at 80° C.

The modified support was then washed with water and dried at 100° C. for 3 hours to yield the functionalized support. Thereafter, the functionalized support was mixed with an acidic solution of palladium chloride (0.6665 g $PdCl_2$ in 500 ml of water). Complete evaporation of the solvent was followed by a calcination step at 300° C. for 6 hours under hydrogen. Washing of the support with water until no free chlorine was detected and drying the support for 3 hours at 100° C. were the final steps of the preparation.

Palladium loading was 4%. The palladium nanocatalyst of Example 7 was used in the Heck reaction to catalyze carbon-carbon coupling of 2-bromo-6-methoxynapthalene with n-butyl vinylether.

Example 8

4% Pd on $SiO_2$ Support

A supported nanocatalyst according to the present invention was prepared using the same steps as in Example 7, except that the support material was $SiO_2$. This nanocatalyst was then used to catalyze carbon-carbon coupling of 2-bromo-6-methoxynapthalene with n-butyl vinylether in a Heck reaction.

The results of the Heck reaction performed using the catalysts of Examples 5-8 are shown in Table I below and according to the following procedure. A glass reactor containing 0.0266 g supported catalyst (0.01 mmol Pd) and $K_2CO_3$ (1.047 g, 7.5 mmoles) was placed under vacuum for 15 minutes during which 5 cycles of evacuation and refilling with argon were performed. A solution of 2-bromo-6-methoxynaphthalene (1.22 g, 5 mmoles) in 13.5 ml of dimethylacetamide was added to the reaction flask followed by the addition of 1.5 ml of n-butylvinylether (10 mmoles). The system was purged with argon and then placed in a stir/hot plate at 140° C. An aliquot was taken every hour to monitor the progress of the reaction. Upon completion, the supported catalyst was removed by filtration and the product analyzed by atomic absorption.

TABLE I

| | Catalyst | Time hrs | Starting Material | MW256 | MW256 | MW256 | % Conv | Metal leaching |
|---|---|---|---|---|---|---|---|---|
| Example 5 | PdCl$_2$ Comparative Homogeneous Catalyst | 21 | 71.5 | 13.5 | 5.0 | 9.9 | 28.5% | N/A |
| Example 6 | 4% Pd/Al$_2$O$_3$—SiO$_2$ Comparative Supported Nanocatalyst | 24 | 58.1 | 19.2 | 6.6 | 16.0 | 41.9% | |
| Example 7 | 4% Pd/Al$_2$O$_3$—SiO$_2$ Supported Nanocatalyst | 24 | 16.2 | 37.9 | 16.7 | 29.2 | 83.8% | |
| Example 8 | 4% Pd/SiO$_2$ Supported Nanocatalyst | 20 | 10.7 | 39.1 | 18.0 | 32.1 | 89.3% | <0.1 ppm |

As plainly shown by the data set forth in Table I, the supported nanocatalysts of Examples 6-8 were far more effective than the homogeneous catalyst of Example 5 in forming the desired MW256 isomers. That indicates that supported palladium nanocatalysts, in general, regardless of how they are manufactured, are superior to homogeneous catalysts in carrying out Heck-carbon coupling reactions. This is a surprising and unexpected result.

Moreover, the supported nanocatalysts of Examples 7 and 8 manufactured according to the inventive methods disclosed herein exhibited far better results than supported nanocatalysts formed in another way, as in Example 6. This is also a surprising and unexpected result.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for functionalizing an inorganic oxide, comprising:
   providing an inorganic oxide substrate, the substrate having a plurality of surface functional groups on the surface thereof;
   (ii) providing a functionalizing agent comprising a plurality of organic functionalizing molecules that are free of silicon, wherein each of the organic functionalizing molecules has at least one bonding functional group capable of bonding to the surface functional groups of the substrate and at least one functionalizing moiety that can give the substrate a desired functionality; and
   (iii) reacting the functionalizing agent with the substrate such that the bonding functional group bonds to the surface of the substrate and the functionalizing moiety remains available to give the substrate the desired functionality so as to yield a functionalized inorganic oxide with functionalizing molecules bonded thereto that do not contain a metal and have functionalizing moieties that are available for bonding.

2. A method as in claim 1, wherein the bonding functional group is selected from the group consisting of a hydroxyl, a carboxyl, a carbonyl, an amide, an amine, a thiol, a sulfonic acid, sulfonyl halide, an acyl halide, and combinations thereof.

3. A method as in claim 1, wherein the bonding functional group is selected from the group consisting of carboxyl, hydroxyl, amine, and sulfonic.

4. A method as in claim 1, wherein the functionalizing moiety is selected from the group consisting of a hydroxyl, a carboxyl, a carbonyl, an amide, an amine, a thiol, a sulfonic acid, sulfonyl halide, an acyl halide, and combinations thereof.

5. A method as in claim 1, wherein the functionalizing moiety is selected from the group consisting of carboxyl, hydroxyl, amine, nitrile, amide, and halide.

6. A method as in claim 1, wherein the functionalizing agent is selected from the group consisting of polyacrylic acid, polyacrylic acid salts, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, and polypropylene glycol, ethanol, propanol, formic acid, acetic acid, oxalic acid, malonic acid, ethylene glycol, propylene glycol, glycolic acid, glucose, citric acid, glycine, alanine, ethanolamine, mercaptoethanol, 2-mercaptoacetate, sulfobenzyl alcohol, sulfobenzoic acid, sulfobenzyl thiol, sulfobenzyl amine, and combinations thereof.

7. A method as in claim 1, further comprising reacting a plurality of catalyst atoms with the functionalized substrate and forming a plurality of supported nanocatalyst particles.

8. A method as in claim 1, wherein the bonding functional group is covalently bonded to the support material.

9. A method as in claim 1, wherein the inorganic oxide comprises silica.

10. A method as in claim 1, wherein the inorganic oxide includes surface functional groups that comprise hydroxyl groups.

11. A method as in claim 1, wherein substrate is a particulate.

12. A method for functionalizing an inorganic oxide, comprising:
   (i) providing an inorganic oxide substrate comprising silica and/or alumina, the substrate having a plurality of hydroxyl groups on a surface thereof;
   (ii) providing a functionalizing agent comprising a plurality of organic functionalizing molecules that are free of silicon and that have at least one bonding functional group and a functionalizing moiety, wherein the functionalizing agent is selected from the group consisting of citric acid, polyacrylic acid, oxalic acid, ethylene glycol, ethanolamine, glycine, glycolic acid, adipic acid, salts thereof, and combinations thereof; and
   (iii) reacting the functionalizing agent with the substrate such that the bonding functional group bonds to the hydroxyl groups on the surface thereof and the functionalizing moiety remains available to give the substrate the desired functionality so as to yield a functionalized inorganic oxide with functionalizing molecules bonded thereto that do not contain a metal and have functionalizing moieties that are available for bonding.

13. A method as in claim 12, wherein the bonding functional group is covalently bonded to the support material.

14. A method for manufacturing a functionalizing catalyst support material, comprising:
   (i) providing an inorganic oxide substrate having a plurality of functional groups on the surface thereof and the substrate having a composition, a particle size, and a surface area suitable for use as a catalyst support for a nanoparticle catalyst;
   (ii) providing a functionalizing agent comprising a plurality of organic molecules that are free of silicon, wherein each of the organic molecules has a first bonding functional group capable of bonding to the functional groups of the substrate and a second functionalizing group that can bond with a catalyst atom; and
   (iii) reacting the functionalizing agent with the support material such that the first bonding functional group bonds to the surface thereof and the second functionalizing group does not contain a metal and remains available to bond with a catalyst atom.

15. A method as in claim 14, wherein the support material has a surface area between about 100 m²/g and about 1000 m²/g.

16. A method as in claim 14, wherein the inorganic oxide is silica or alumina.

17. A method as in claim 14, wherein the catalyst support comprises titania, kieselguhr, diatomaceous earth, bentonite, clay, zirconia, or magnesia.

18. A method as in claim 14, wherein the functionalizing agent covalently bonds to the support material.

19. A method as in claim 1, wherein the bonding functional group is selected from the group consisting of a hydroxyl, a carboxyl, a carbonyl, an amide, an amine, a thiol, a sulfonic acid, sulfonyl halide, an acyl halide, and combinations thereof.

20. A method as in claim 1, wherein the functionalizing moiety is selected from the group consisting of a hydroxyl, a carboxyl, a carbonyl, an amide, an amine, a thiol, a sulfonic acid, sulfonyl halide, an acyl halide, and combinations thereof.

21. A method as in claim 14, wherein the functionalizing agent is selected from the group consisting of citric acid, polyacrylic acid, oxalic acid, ethylene glycol, ethanolamine, glycine, glycolic acid, adipic acid, salts thereof, and combinations thereof.

22. A method for manufacturing a functionalized filler material, comprising:
   (i) providing an inorganic oxide substrate having a plurality of surface functional groups on the surface thereof, the substrate having a composition, a particle size, and a surface area suitable for use as a filler material;
   (ii) providing a functionalizing agent comprising a plurality of organic molecules that are free of silicon and metal atoms, wherein each of the organic molecules has a first bonding functional group capable of bonding to the surface functional groups of the substrate and a second functionalizing group that can bond with a polymeric material; and
   (iii) reacting the functionalizing agent with the substrate such that the first functional group bonds to the surface thereof and the second functional group does not contain a metal and remains available to bond with a polymeric material.

23. A method as in claim 22, wherein the functionalizing moiety is aromatic.

24. A method as in claim 22, further comprising mixing the functionalized filler material with a polymeric material.

25. A method as in claim 22, wherein the functionalizing moiety is an electron acceptor.

26. A method as in claim 24, wherein the functionalized filler material is mixed with nitrile rubber.

27. A method as in claim 24, wherein the functionalized filler material is mixed with polystyrene.

28. A method as in claim 1, further comprising mixing the functionalized inorganic oxide with a polymeric material.

29. A method as in claim 12, further comprising mixing the functionalized inorganic oxide with a polymeric material.

* * * * *

UNITED STATES PATENT AND TRADEMARK OFFICE
CERTIFICATE OF CORRECTION

PATENT NO.      : 8,097,229 B2                                         Page 1 of 1
APPLICATION NO. : 11/333559
DATED           : January 17, 2012
INVENTOR(S)     : Zhou et al.

It is certified that error appears in the above-identified patent and that said Letters Patent is hereby corrected as shown below:

Column 1
Line 43, change "Therefore" to --Therefore,--

Column 2
Line 54, change "do" to --due--
Line 59, change "such" to --such as--

Column 8
Line 40, change "produce" to --produce a--

Column 11
Line 45, Claim 1, change "providing" to --(i) providing--

Signed and Sealed this
Fourth Day of September, 2012

David J. Kappos
*Director of the United States Patent and Trademark Office*